Figure 1:
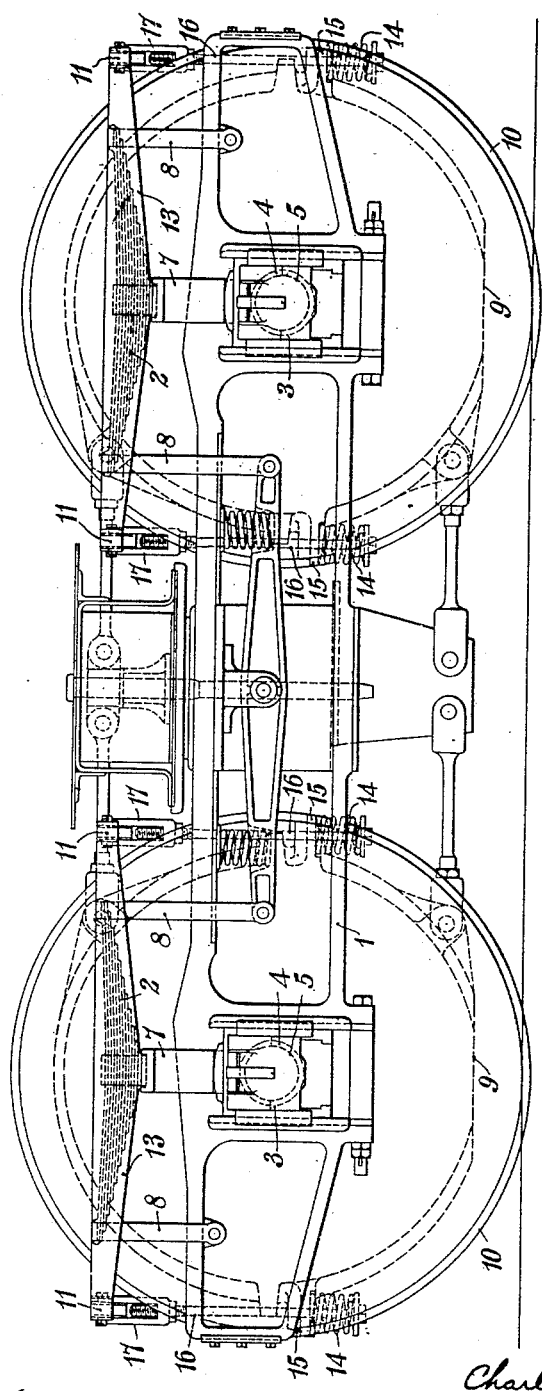

No. 862,198. PATENTED AUG. 6, 1907.
C. A. PSILANDER.
SUSPENSION MEANS FOR ELECTRIC MOTORS.
APPLICATION FILED DEC. 27, 1906.

2 SHEETS—SHEET 1.

WITNESSES:
C. L. Belcher
Otto S. Schairer

INVENTOR
Charles A. Psilander
BY
Harley S. Carr
ATTORNEY

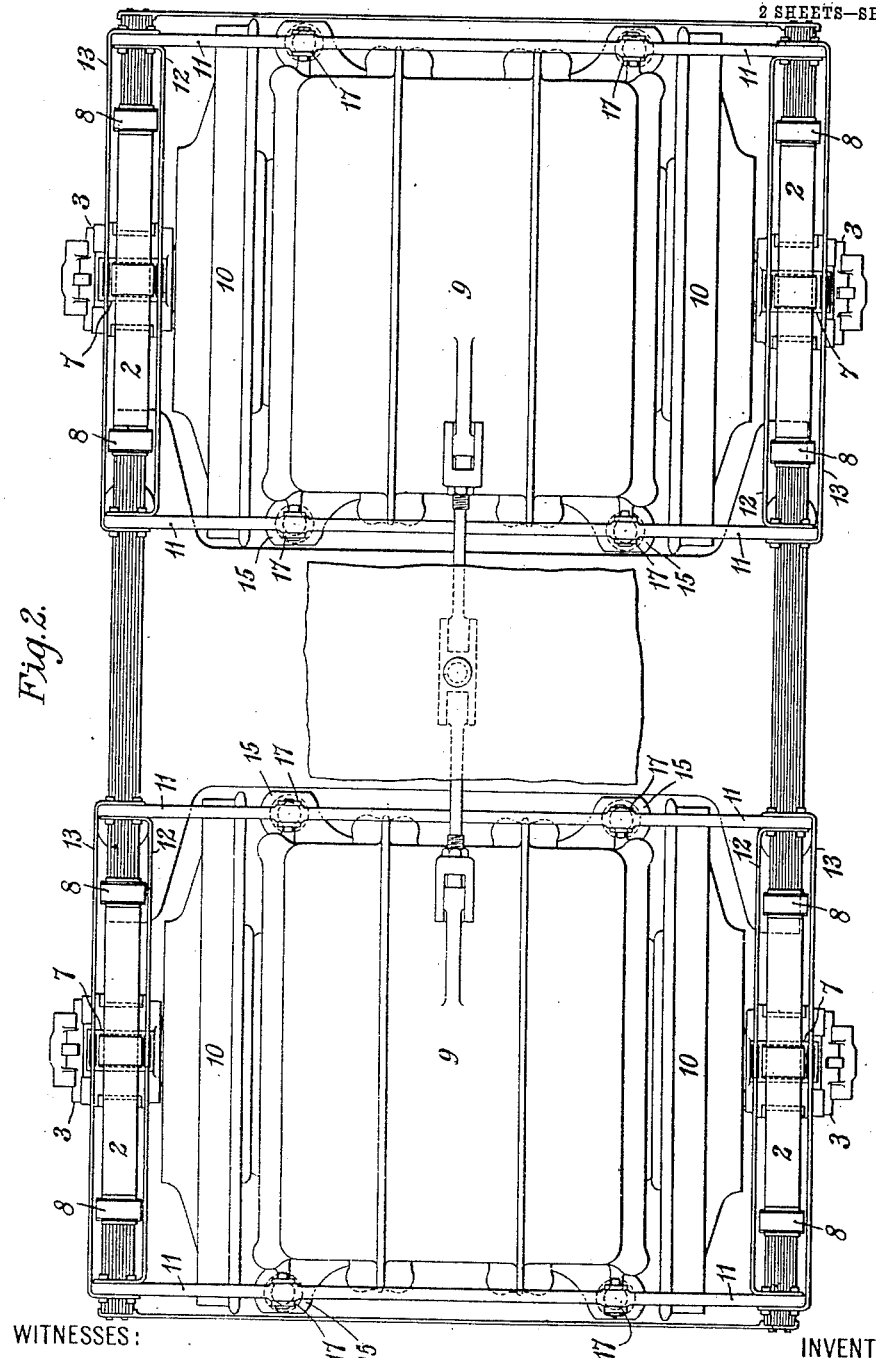

UNITED STATES PATENT OFFICE.

CHARLES A. PSILANDER, OF PITTSBURG, PENNSYLVANIA, ASSIGNOR TO WESTINGHOUSE ELECTRIC & MANUFACTURING COMPANY, A CORPORATION OF PENNSYLVANIA.

SUSPENSION MEANS FOR ELECTRIC MOTORS.

No. 862,198.     Specification of Letters Patent.     Patented Aug. 6, 1907.

Application filed December 27, 1906. Serial No. 349,693.

*To all whom it may concern:*

Be it known that I, CHARLES A. PSILANDER, a citizen of the United States, and a resident of Pittsburg, in the county of Allegheny and State of Pennsylvania, have invented a new and useful Improvement in Suspension Means for Electric Motors, of which the following is a specification.

My invention relates to electric locomotives, and similar vehicles, and particularly to the trucks of such vehicles and to means for suspending their propelling motors.

The object of my invention is to resiliently support the motors, independently of the truck frame, by means that permit of a simplified structure and arrangement of the parts, over what has heretofore been provided.

When locomotives or other vehicles are propelled by very large and heavy motors, it is desirable that they be resiliently supported upon the journal boxes independently of the truck frame, which usually carries the cab or body and the remaining parts of the vehicle, in order that greater flexibility of suspension and other advantageous results may be secured.

In another structure with which I am familiar, two sets of leaf springs, that respectively support the truck frame and the motors, are mounted upon the journal boxes, one set being placed above the other. However, in this arrangement an unduly large amount of space is occupied on account of the super-position of the two sets of springs, and it is accordingly the specific object of the present invention to provide means for resiliently supporting the motors that shall occupy less space and shall be otherwise more satisfactory in service than the means above referred to.

Figure 1 of the accompanying drawings is a view, in side elevation, of the truck of a locomotive that embodies my invention, and Fig. 2 is a plan view of the truck shown in Fig. 1.

A main frame 1 for the truck is resiliently supported by means of a set of leaf springs 2 upon journal boxes or housings 3 containing bearings 4 for axles 5, the springs being seated at their middle points upon supports or brackets 7 that are mounted upon the journal boxes 3, and the frame 1 is secured to the ends of the springs by means of links 8. The axles 5 are directly surrounded by propelling motors 9 that are resiliently connected to driving wheels 10 upon the ends of the axles, preferably by the means forming the subject-matter of Patent No. 816,611, granted to Westinghouse Electric & Manufacturing Company, as assignee of Robert Siegfried. The upper parts of the motors are surrounded by frames or cradles having cross bars 11 and side members comprising side-by-side bars 12 and 13 that are spaced apart and are disposed on opposite sides of the leaf springs 2, the side members being also seated upon the supports or brackets 7. The motors are resiliently supported upon helical compression springs 14 that are interposed between lugs 15 upon the motor frames and the heads at the lower ends of hanger rods 16. The upper ends of the rods 16 are screw-threaded into the lower ends of U-shaped nuts 17 that embrace and are secured to the cross bars 11 of the frames surrounding the motors. The motors are thus resiliently supported independently of the truck frame, and, since the side members of the motor-supporting frames or cradles surround the springs for supporting the truck frame, a very compact and simple structure is provided.

While the invention has been shown and described as employed in connection with motors of the gearless type, it will, of course, be understood that it may be employed, if desired, for supporting motors of the geared type or for supporting other parts than the motors of a vehicle, independently of the truck frame.

I claim as my invention:

1. The combination with an axle, bearings thereon, boxes or housings for the bearings, a truck frame, and means for resiliently supporting the same comprising leaf springs mounted upon the said boxes or housings, of a motor, and means for resiliently supporting the same comprising a frame having members composed of side-by-side parts that are mounted upon the bearing boxes or housings and between which the leaf springs are located.

2. The combination with an axle, bearings thereon, boxes or housings for the bearings, a truck frame, and means for resiliently supporting the same comprising leaf springs mounted upon the said boxes or housings, of a motor, and means for supporting the same comprising a frame having members composed of side-by-side parts that are mounted upon the bearing boxes or housings and between which the leaf springs are located, and other members to which the motors are resiliently connected.

3. The combination with an axle, bearings thereon, boxes or housings for the bearings, a truck frame, and means for supporting the same comprising resilient members mounted upon the said boxes or housings, of a motor, and means for resiliently supporting the same comprising a frame having members composed of side-by-side bars that are mounted upon the boxes or housings and between which the resilient means are located.

4. The combination with an axle, bearings thereon, a truck frame, means for resiliently supporting the same comprising members seated upon the bearings, a motor, and means for supporting the same comprising a frame having side portions that are seated upon the bearings and surround said members.

In testimony whereof, I have hereunto subscribed my name this 22nd day of December, 1906.

CHARLES A. PSILANDER.

Witnesses:
   E. TIDLUND,
   BIRNEY HINES.